US006674717B1

(12) United States Patent
Duong-van et al.

(10) Patent No.: US 6,674,717 B1
(45) Date of Patent: Jan. 6, 2004

(54) METHOD FOR REDUCING PACKET LOSS AND INCREASING INTERNET FLOW BY FEEDBACK CONTROL

(75) Inventors: Minh Duong-van, Menlo Park, CA (US); Tomas J. Pavel, San Jose, CA (US); Han C. Wen, San Jose, CA (US)

(73) Assignee: Network Physics, Inc., Menlo Park, GA (US)

( * ) Notice: Subject to any disclaimer, the term of this patent is extended or adjusted under 35 U.S.C. 154(b) by 0 days.

(21) Appl. No.: 09/539,434

(22) Filed: Mar. 30, 2000

(51) Int. Cl.[7] .............................................. H04L 12/26
(52) U.S. Cl. ...................................... 370/230; 370/439
(58) Field of Search ................................. 370/230, 231, 370/232, 229, 235, 253, 237, 471, 389, 401, 439, 400, 395.41, 395.52; 704/500

(56) References Cited

U.S. PATENT DOCUMENTS

| | | | |
|---|---|---|---|
| 5,367,523 A | * 11/1994 | Chang et al. ................ | 370/235 |
| 5,646,943 A | * 7/1997 | Elwalid ....................... | 370/230 |
| 5,930,364 A | * 7/1999 | Kim ............................. | 380/28 |
| 5,995,488 A | * 11/1999 | Kalkunte et al. ........... | 370/232 |

FOREIGN PATENT DOCUMENTS

| | | |
|---|---|---|
| EP | 0817433 A2 | 6/1997 |
| WO | WO 00/02356 | 1/2000 |

OTHER PUBLICATIONS

John B. Pippas, Iakovos S. Venieris and Jorge-A Sanchez-P., "Shaping Aggregate LAN Flows for Transmission over ABR Connections", *National Technical University of Athens,Electrical and Conputer Engineering Department*, vol. 10, No. 1, Jan.-Feb. 1999, pp. 45-56.

Nguyen Chien Trinh and Tetsuya Miki, "Dynamic resource allocation for self-similar traffic in ATM network", *The University of Electro-Communications*, pp. 160-165.

* cited by examiner

*Primary Examiner*—Chi Pham
*Assistant Examiner*—Alexander Boakye
(74) *Attorney, Agent, or Firm*—Blakely Sokoloff Taylor & Zafman LLP

(57) ABSTRACT

End-to-end packet losses of one or more traffic streams transmitted across a congested network may be reduced by modulating the bandwidths of the corresponding traffic streams applied to node(s) of the network from one or more control points along the network topology. This reduction in packet loss results in a reduction in fluctuations or variability of the controlled traffic streams, an increase in bandwidth utilization and a reduction in times to transmit files. The control points can be either upstream or downstream of one or more congestion points along the network. The modulation of the bandwidths are governed by a nonlinear differential equation that involves feedback of the throughput and buffer occupancy level. The control terms involve a relaxation time, coupling constant, control constant and nonlinear feedback constants.

24 Claims, 5 Drawing Sheets

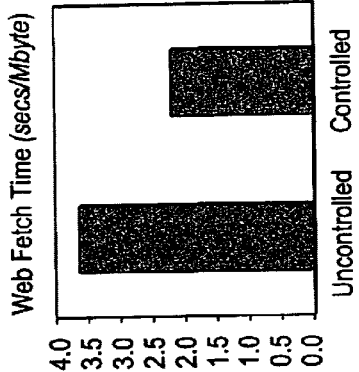
FIG. 5e
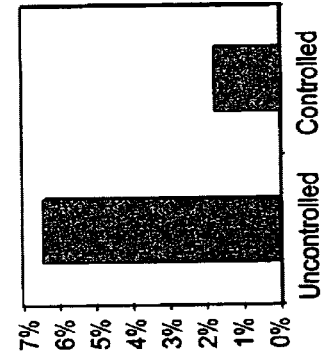
FIG. 5d
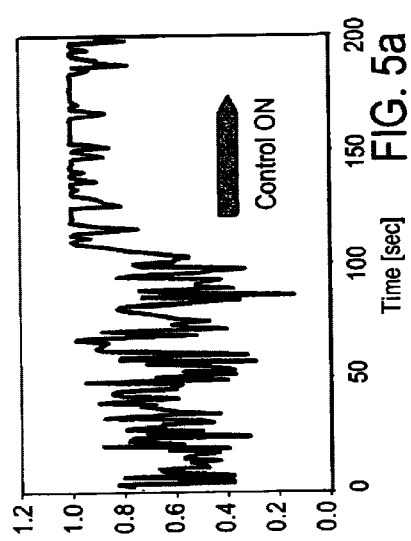
FIG. 5a
FIG. 5c
FIG. 5b

METHOD FOR REDUCING PACKET LOSS AND INCREASING INTERNET FLOW BY FEEDBACK CONTROL

FIELD OF THE INVENTION

The present invention relates to a scheme for congestion control/avoidance in communication networks that rely on packet switching techniques to transport information between nodes therein.

BACKGROUND

Many communication networks, such as the Internet, rely on packet switching technologies (e.g., X.25, frame relay, asynchronous transfer mode, etc.) to transport variable or uniform blocks (usually termed packets or cells) of data between nodes. The term packet will be used herein to collectively refer to any such block of information. Such networks generally perform two major functions: routing and congestion control. The object of routing is to deliver, correctly and sometimes in sequence, the packets from a source to a destination. The object of congestion control is to maintain the number of packets within the network (or a region or sub-network thereof) below a level at which queuing delays become excessive. Due to finite resources, packets may be dropped rather than queued.

In essence, a packet switched network is a network of queues communicatively coupled together by communication links (which may be made up of various physical media). At each network node (e.g., a switch or router), there exists one or more queues of packets for each outgoing link. If the rate at which packets arrive and queue up exceeds the rate at which packets are transmitted, queue size grows without bound and the delay experienced by a packet tends towards infinity.

In an ideal case, network throughput, and hence network use, should increase to an offered load up to the physical capacity of the network and remain at capacity if the load is further increased. This ideal case, however, requires that all nodes somehow know the timing and rate of packets that will be presented to the network with no overload and no delay in acquiring this information; a situation which is not possible. If no congestion control is exercised, as the load increases, use increases for a while. Then, as the queue lengths at various nodes begin to grow, throughput actually drops. This is due to the fact that the queues are constrained to a finite length by the physical size of the memories in which they exist. When a node's memory (i.e., its queues) is full, it must drop (i.e., discard) additional incoming packets. Thus, the source is forced to retransmit these packets in addition to any new packets it might have. This only serves to worsen the situation. As more and more packets are retransmitted, the load on the network grows and more and more nodes become saturated. Eventually, even a successfully delivered packet may be retransmitted because it takes so long to get to its destination (whereupon it may be acknowledged by the destination node) that the source actually assumes that the packet was lost and tries to retransmit it. Under such circumstances, the effective capacity of the network can be virtually zero.

Contrary to what one might believe, the solution to this problem is not simply to allow the queue lengths to grow indefinitely. Indeed, it has been shown that even where queue lengths are allowed to be infinite, congestion can occur. See, e.g., John Nagle, "On Packet Switches with Infinite Storage", Network Working Group, Internet Engineering Task Force, RFC 970 (1985). One reason that this is true is that packets are often coded with an upper bound on their life, thus causing expired packets to be dropped and retransmitted, adding to the already overwhelming volume of traffic within the network.

It is clear that catastrophic network failures due to congestion should (indeed, must) be avoided and preventing such failures is the task of congestion control processes within packet switched networks. To date, however, the object of such congestion control processes has been to limit queue lengths at the various network nodes so as to avoid throughput collapse. Such non-TCP techniques require the transmission of some control information between the nodes and this overhead itself tends to limit the available network bandwidth for data traffic. Nevertheless, a good congestion control process maintains a throughput that differs from a theoretical ideal by an amount roughly equal to its control overhead.

Even these "good" congestion control processes, however, are not good enough. Studies of traffic flow across the Internet show that bandwidth of the various communication links is underutilized even in the presence of congestion. That is, even though excess capacity exists on the communication links that couple various nodes of the Internet to one another, packets are still being dropped within the network. One reason that conventional congestion control processes have failed in this fashion is that such processes do not take into account the true nature of network traffic.

SUMMARY OF THE INVENTION

In the general case, packet loss within a congested network is controlled by modulating packet bandwidths over selected communication links according to a process that can be represented by a nonlinear differential equation that involves the throughput of the communication links and the buffer occupancy level of a control node associated with the communication links. These terms may be combined to form a product thereof within the equation. Various control terms of the nonlinear differential equation involve one or more of a relaxation time, a coupling constant, a control constant and one or more nonlinear feedback constants. The relaxation time may be set empirically according to network conditions so as to provide a desired response time to fluctuations in traffic within the network.

In one embodiment then, packet loss within a congested network is controlled by modulating packet bandwidths over selected communication links within the network at control points thereof, such variations of the packet bandwidth providing feedback to packet origination locations so as to cause these origination locations to alter the rate at which new packets are introduced into the network. Preferably, though not necessarily, the modulation of the packet bandwidth is performed at an aggregate level for all traffic streams utilizing the selected communication links. The modulation of the packet bandwidth may also be performed dynamically in response to measured network performance metrics; such as the throughput of the selected communication links input to the control points and/or the buffer occupancy level at the control-points. The network performance metrics may be measured according to at least one of: a moving average of the measured quantity, a standard average of the measured quantity, or another filtered average of the measured quantity.

The modulation of the packet bandwidth is achieved, in one embodiment of the present invention, by varying an inter-packet delay time over the selected communication links at the control points. The control points themselves may be located upstream or even downstream (or both) of congested nodes within the network and need only be located on only a few of a number of communication links that are coupled to a congested node within the network. More generally, the control points need only be associated with a fraction of the total number of traffic streams applied to a congested node within the network.

Still another embodiment of the present invention provides a communication network comprising a number of nodes interconnected with one another through one or more communication links, a first one of the nodes being configured to control packet loss within the network by modulating packet bandwidths over selected ones of the communication links according to a process that can be represented by the above-described nonlinear differential equation.

BRIEF DESCRIPTION OF THE DRAWINGS

The present invention is illustrated by way of example, and not limitation, in the figures of the accompanying drawings in which like reference numerals refer to similar elements and in which:

FIGS. 5a–5e are graphical representations of improvements that may be experienced within the network of FIG. 4 after application of the feedback control which is an embodiment of the present invention, in particular, FIG. 5a is a plot showing the improvement in throughput and variability as a function of time that is experiences after the control processes are applied, while FIGS. 5b and 5c are bar graph representations of this improvement, FIG. 5d is a bar graph showing the improvement in packet loss experienced through use of these control processes and FIG. 5e is a bar graph showing the improvement in fetch times for Web pages that are experienced by an end user through use of the control processes.

DETAILED DESCRIPTION

A scheme for decreasing packet loss thereby increasing traffic flow in a computer network, such as the Internet, is disclosed herein. Although discussed with reference to certain illustrated embodiments, upon review of this specification, those of ordinary skill in the art will recognize that the present scheme may find application in a variety of systems. Therefore, in the following description the illustrated embodiments should be regarded as exemplary only and should not be deemed to be limiting in scope. It should also be noted that as used herein the term "packet" is meant to broadly refer to packets, cells and other forms of information units used to transport data and/or control information within communications infrastructures (e.g., computer networks, telecommunications networks, data communication networks and the like, for example, the Internet) wherein resources are shared among multiple users and multiple information or traffic streams.

Existing congestion control approaches have generally viewed network traffic (e.g., the generation of new packets to be injected into a network) as essentially random processes. However, recent work in the area of traffic modeling has shown that network traffic is in fact chaotic in nature. None of the currently proposed congestion control methodologies capture or exploit this characteristic.

Figure 1:
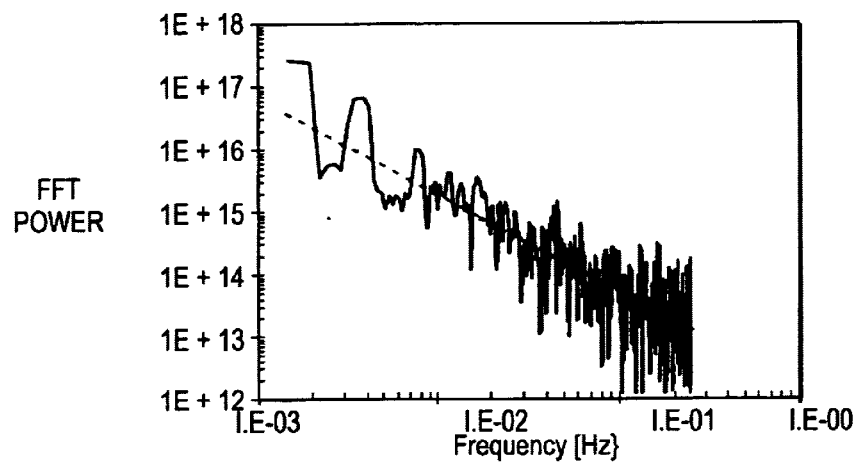
FIG. 1 shows the Fourier power spectrum of traffic generated from a Pareto distribution of file sizes that is not subjected to the TCP protocol.
Figure 2:
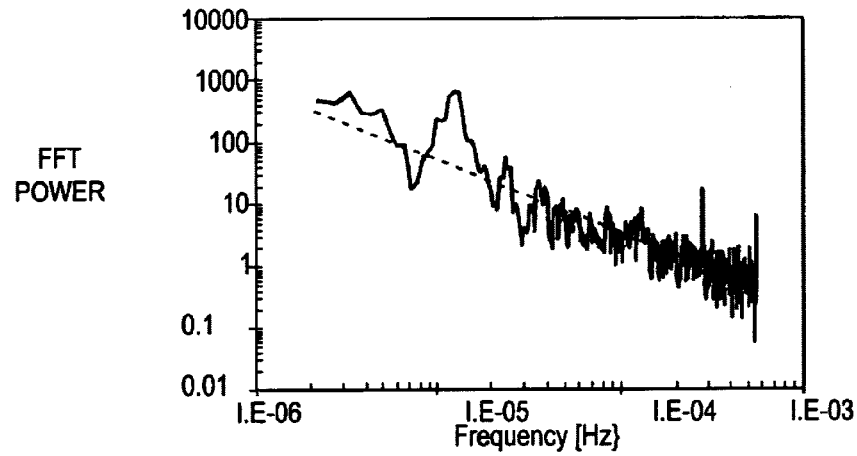
FIG. 2 shows the Fourier power spectrum of uncongested and under-supplied traffic that is subjected to the TCP protocol.
Figure 3:
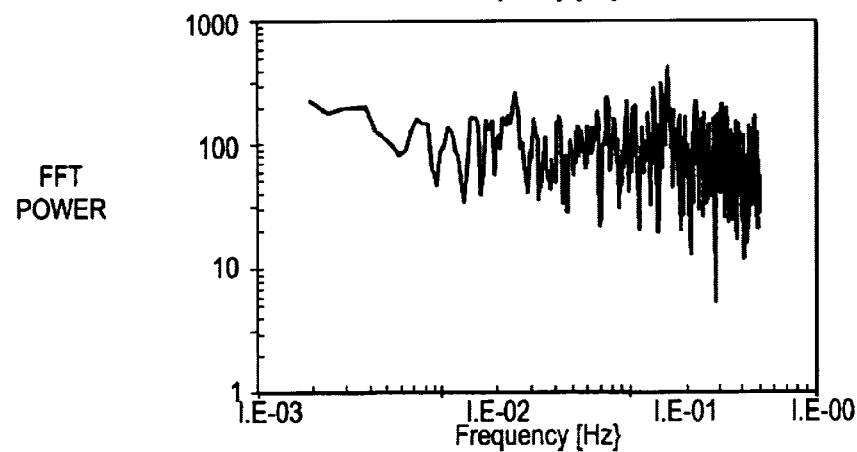
FIG. 3 shows the Fourier power spectrum of congested and over-supplied traffic that is subjected to the TCP protocol.

Other studies from the academic community have shown that the time series of network traffic throughput is not Poisson, but fractal. Namely, the "bursty" behavior seen in a time series at a given time scale is also seen at all other time scales. This "self-similarity" is one of the signatures that characterize a fractal time series. However, the present applicants have discovered that this "self-similar" signature is not present for heavily congested network traffic. The present applicants have verified that the traffic generated without any TCP protocol exhibits a fractal time series if the files transmitted are drawn randomly from a Pareto distribution of file sizes. The Fourier power spectrum in this case is a power law that on a log-log scale is linear, as shown in FIG. 1. This power law behavior is another signature of a fractal time series. The present applicants have also discovered that traffic flow with TCP protocol is also fractal, but only if the network topology is under-supplied with traffic. In this situation, the only significant portion of the TCP protocol responsible for the traffic dynamics is the receiver's window size. See FIG. 2. However, when the network topology is congested with traffic, the packet losses coupled with the non-linearity of the TCP congestion avoidance algorithm results in a time series that loses its fractality and multi-fractality. The corresponding Fourier power spectrum shows no power law behavior and is shown in FIG. 3. Even though the time series is not fractal, it is still chaotic.

The term "chaos" is used to describe the apparently random behavior exhibited by many deterministic nonlinear dynamical systems. Such systems manifest a rather remarkable phenomenon in that their deterministic property implies that all future states are determined from the present state. Thus, on one hand there is complete future knowledge of the system, while on the other there is seemingly random motion.

Chaos then is the long-term aperiodic behavior of a deterministic, nonlinear, dynamical system that exhibits sensitivity to initial conditions. Aperiodicity is the property that orbits never repeat themselves exactly; however they may get arbitrarily close to doing so, as observed in periodic windows. The other, perhaps more important, property is the sensitivity of the system to tiny perturbations. Consider two given points in phase space that are distinct but lie arbitrarily close to each other, then one might assume that their orbits will remain close forever. In fact, just the opposite is observed; the orbits separate exponentially in a bounded region of state space.

As indicated above, current congestion control processes simply do not take the chaotic network traffic characteristics into account and, therefore, cannot be expected to be optimum solutions to the congestion problem. What is needed therefore, is a congestion control scheme that does account for the chaotic nature of network traffic flow.

To more fully appreciate the present methods, it is helpful to understand why network traffic is chaotic in nature. Consider then a series of packet transmissions between a source and a receiver. Suppose these transmissions take place across one or more networks, through one or more intervening nodes, such as switches and/or routers. Suppose further that the transmissions are controlled using the well-known transmission control protocol (TCP), as is true for most transmissions that take place across the Internet.

Very early in the development of the modern Internet, it was discovered that some control over the manner in which packets were injected into the network by the source was needed. Originally, TCP allowed a source to inject multiple packets into a network, up to a limit corresponding to a window or buffer size advertised by the receiver. Although such a scheme may work where the source and the receiver are connected to the same local area network, it was soon found that where routers having finite buffer sizes are disposed between the source and the receiver, problems arise as these routers soon run out of space to hold the incoming packets. To combat this problem Jacobson and Karels developed a "slow start" procedure wherein the source limits the rate at which it injects new packets into the network according to the rate at which acknowledgements of successful receptions are returned by the receiver. Van Jacobson and Michael J. Karels, "Congestion Avoidance and Control", Proceedings of SIGCOMM '88 (Stanford, Calif., August 1988), ACM.

Under the slow start procedure, a so-called congestion window is added to the source's TCP implementation. When a connection is established with a resource on another network, this congestion window is initialized to one segment (e.g., the segment or packet size advertised by the resource or a default packet size). Each time an acknowledgement is received, the congestion window is incremented and the source is allowed to inject a number of packets up to the minimum of the current congestion window size or the receiver's advertised window. Over time, the source's congestion window will grow exponentially until at some point the capacity of the intervening network is reached and some intermediate router begins dropping packets. This is an indication to the source that its congestion window has gotten too large. See, e.g., W. Richard Stevens, TCP/IP Illustrated, Vol. 1: The Protocols (1994) and Gary W. Wright and W. Richard Stevens, TCP/IP Illustrated, Vol. 2: The Implementation (1995).

At this point, and where the slow start process is run in concert with a conventional congestion avoidance procedure, the source resets its congestion window to one, and the process repeats up to the point at which the congestion window becomes half the size at which packet loss occurred previously. After this point, the congestion avoidance process takes over and begins incrementing the congestion window in a linear fashion (rather than in an exponential fashion as under the slow start process) in response to receiver acknowledgements.

This sudden change from an exponentially growing number of packets being injected to a linearly growing number of packets being injected presents a discontinuity. Such discontinuities are observed at the intervening router for each of the connections it is servicing. Moreover, the discontinuities appear at random as there is no synchronization between the different sources injecting packets into the network. It is the interaction between the discontinuities that result from the operation of the TCP and the randomness at which they are manifest at the routers within the network that gives rise to the chaotic nature of network (e.g., Internet) traffic.

While investigating the phenomena described above, the present applicants have discovered that if the dynamics are controlled such that the packet loss is minimized, then the burstiness of the traffic flow is reduced and the network bandwidth utilization will be maximized. In essence, this method exploits the nonlinear dynamics of the chaotic flows of the network traffic; something which conventional congestion control processes simply do not do.

Under the present scheme, the end-to-end packet losses of one or more traffic streams transmitted across a congested network may be reduced by modulating the bandwidths (i.e., the inter-packet delay) of the corresponding traffic streams applied to the node(s) of the network from one or more control points along the network topology. This reduction in packet loss results in a reduction in fluctuations or variability of the controlled traffic streams, an increase in bandwidth utilization of a congested link at downstream points and a reduction in times to transmit files (e.g., to an end-user). The control points can be either upstream or downstream of one or more congestion points along the network.

The modulation of the bandwidths of the traffic streams is governed by the following linear differential equation, henceforth referred to as Equation 1:

$$\frac{dBW}{dt} = \left(\frac{1}{R}\right)[n \cdot (TP)^{C1} \cdot (BO)^{C2} - K \cdot (BW)^{C3}] \quad \text{(Equation 1)}$$

where the measured terms are defined as follows:

TP=throughput or bandwidth utilization of the communication link(s) under consideration;

BO=buffer occupancy level or queue time within the control unit on the communication links under consideration; and the control terms are defined as follows:

BW=the control or modulated bandwidth of the communication link from the control unit to a downstream point or node;

R=relaxation time (which may be set empirically over a robust range depending upon network conditions—note that if R is set as too small a value, the present control scheme will be ineffective because insufficient time is allowed for the feedback control to operate over the network topology and if R is set at too long a period the control system will not be able to react promptly to fluctuations in the traffic flow);

n=linear coupling constant;

K=linear control constant; and

C1, C2 and C3=nonlinear feedback constants

The nonlinear driving term in the time rate of change of the modulated bandwidth is the product of the throughput and buffer occupancy (TP·BO). Due to the nature of the approach to criticality of Equation 1, there are nonlinear feedback constants, C1, C2 and C3. The measured terms (TP and BO) may be determined according to a filtered measure such as an average or any moving average. The filtered measure of throughput (TP) or buffer occupancy level (BO) is taken over a sampling interval, which may be determined by a history of the measured quantity for the one or more traffic streams, buffering times of packets within the one or more traffic streams, or a combination of the history of the measured quantity for the one or more traffic streams and buffering times of packets within the one or more traffic streams.

By modulating the bandwidth of the traffic streams in the fashion described by Equation 1, feedback to the packet origin points (e.g., origin servers) congestion avoidance processes or algorithms is provided via acknowledgement delays from the ultimate client. That is, the time at which such acknowledgements are received at these servers is increased. This feedback indirectly (i.e., through existing congestion avoidance processes present in packet networks) control the rate at which the server transmits new packets into the network in such a way that overall packet loss is minimized.

Thus, the present scheme introduces feedback control upstream or downstream of a congested node (such as a router or switch) to reduce packet loss and thereby smooth traffic flow and provide for increased throughput through that node (and even other downstream nodes). The feedback may be applied using a separate control node upstream or downstream of the congested node, or the feedback mechanisms may be integrated into existing network nodes. The feedback may be applied at frequencies (i.e., time intervals) that depend on the characteristics of the network traffic media (e.g., the bandwidth of the communication links). By applying the feedback control described herein, the packet loss across multiple congested nodes are reduced, resulting in higher network throughput. Not only is throughput improved for the node immediately downstream of the point of feedback control, it may also be improved for subsequent downstream nodes.

Figure 4:
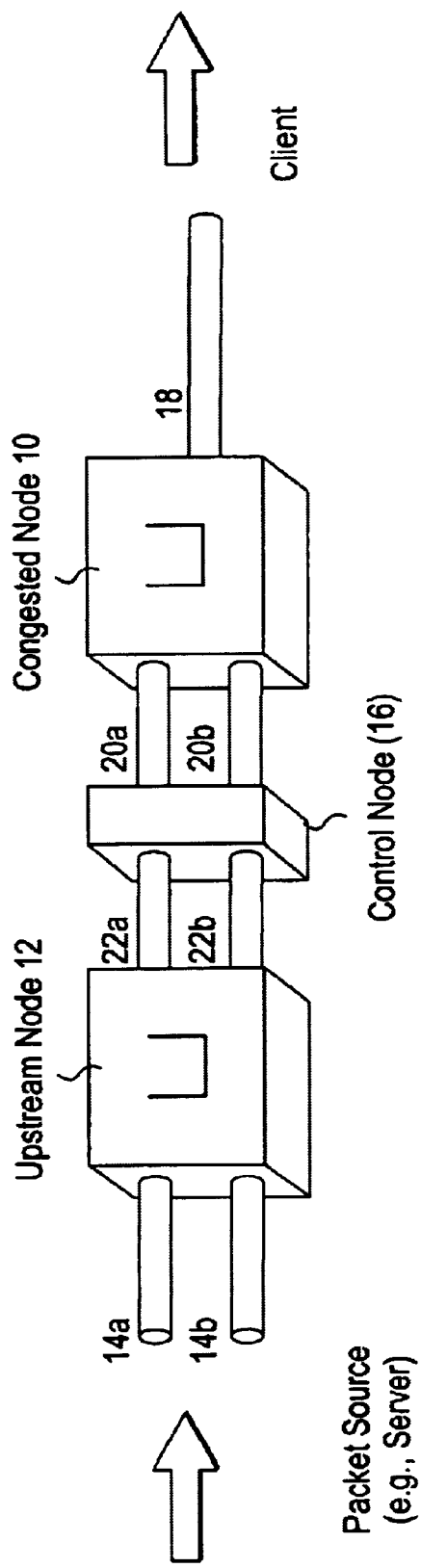
FIG. 4 illustrates a model of a computer network having a feedback control node upstream of an otherwise congested node in accordance with an embodiment of the present invention.

FIG. 4 illustrates an example of the use of a feedback control device upstream of an otherwise congested network node in accordance with the present scheme. The otherwise congested node 10 is downstream of an upstream node 12, which receives bursty HTTP (hypertext transfer protocol) traffic on one or more communication links 14a–14b. Feedback control unit 16 is introduced between nodes 12 and 10 so as to be downstream of node 12 but upstream of node 10. In other embodiments, feedback control unit 16 may be integrated in either of nodes 10 or 12 at the appropriate input or output thereof or even used downstream of node 10.

To provide for the smoothed HTTP output 18 from node 10, the output bandwidth (e.g., packets/time interval) from the feedback control unit 16 is limited to a value determined from the input rate thereto and, optionally, other factors as discussed below and presented in Equation 1. That is, as used herein the term feedback should be understood to indicate a mechanism of varying the bandwidth as a function of time indirectly by controlling the delays between packets. This is a counter-intuitive approach to congestion control, as the intentional introduction of additional delay in a network is not generally considered an advantage. However, this delay along the network topology is offset by the reduction in delay that the packets would normally spend at the server due to the congestion and packet loss. The end-user experiences the actual delay described by the sum of the delay in the network and the delay from packets queued at the server. This overall delay is reduced by the application of the present feedback control.

For an illustration of the feedback control for the network topology described in FIG. 4, consider a reduced form of feedback control Equation 1. First convert Equation 1 into a Newton recursion relation:

where $BW_i$ is the new value of the modulated bandwidth for the current sampling $$\frac{BW_i - BW_{i-1}}{\Delta t} = \left(\frac{1}{R}\right)[n \cdot (TP_{i-1})^{C1} \cdot (BO_{i-1})^{C2} - K \cdot (BW_{i-1})^{C3}]$$

interval and $BW_{i-1}$ is the value from the previous sampling interval. Solving for $BW_i$ and setting C3=1 gives:

$$BW_i = \left(\frac{\Delta t}{R}\right)[n \cdot (TP_{i-1})^{C1} \cdot (BO_{i-1})^{C2}] + \left(1 - \frac{\Delta t \cdot K}{R}\right) \cdot (BW_{i-1})$$

For simplicity of implementation, first consider the special case of linear throughput feedback (C1=1), ignoring the effects of buffer occupancy level (C2=0) and the effects of previous modulated bandwidths (K/R=1/Δt). The feedback recursion relation reduces further $$BW_i = \left(\frac{n \cdot \Delta t}{R}\right)(TP_{i-1})$$

to:

where the coefficient multiplying the measured throughput, $TP_{i-1}$ is referred to as the gain factor. The results of this reduced feedback control for the network topology that is illustrated in FIG. 4 are shown in FIGS. 5a–5e.

FIG. 5a is a plot of throughput (normalized) versus time for aggregate traffic through the network of FIG. 4 as seen by the client. Notice that at times t<100, no feedback control is applied. The throughput is extremely variable, and averages only approximately 60% or so of the available capacity (see the bar graph in FIG. 5b). At times t≧100, however, the present control process is applied and an approximate 52% increase in throughput is experienced, while variability is reduced by approximately 65% (see the bar graph in FIG. 5c). Even further, packet loss within the network is reduced by approximately 73% (see the bar graph in FIG. 5d). This may seem counterintuitive in as much as increased delay is often associated with increased packet loss due to retransmissions of packets believed to have been dropped. However, the present control processes allow for improved packet loss characteristics and, perhaps most importantly, a better user experience as noted by the reduction in fetch time for web pages (see the bar graph in FIG. 5e). The values reported in this illustration are typical for real world file size distributions and timings.

In these results, a moving average of the measured throughput was implemented. As indicated above, the moving average need not be used and can be replaced by the average of the input rate or some other filtered measured value. This controlled feedback is effective when using the throughput history (backward-looking) or by buffering the inputs (forward-looking) to control node 16 to derive the input rate. Indeed, the delay interval can be arrived at using a combination of both backward- and forward-looking input rates. The sampling period can end at the present time or at some time in the past.

In the general application of feedback control Equation 1, significant improvements in bandwidth utilization have been found for all of the following classes of control parameters:
1. Keeping only the throughput term (TP) by setting C1=C3=1,C2=0 and K/R=1/Δt
2. Keeping only the buffer occupancy level term (BO) by setting C1=0, C2=C3=1 and K/R=1/Δt
3. Keeping all the terms except ignoring the nonlinear feedback constants, (C1=C2=C3=1)

4. Keeping all the terms while varying the nonlinear feedback constants, (C1, C2, C3) from non-unity (≠1)

In specific applications, one of the four classes of control parameters may be the most effective, depending upon the application, the nature of the topology and congestion and how other control technologies may be incorporated in tandem.

Consider now a network topology where multiple links direct traffic through a congested node, and the feedback control unit is applied to only one of these links. The benefits of packet loss reduction that the feedback control unit delivers translates into significantly higher bandwidth utilization through this congested node, even in the face of uncontrolled external traffic. The gains in bandwidth utilization for the feedback-controlled traffic are independent of the loads from the external traffic.

Figure 6:
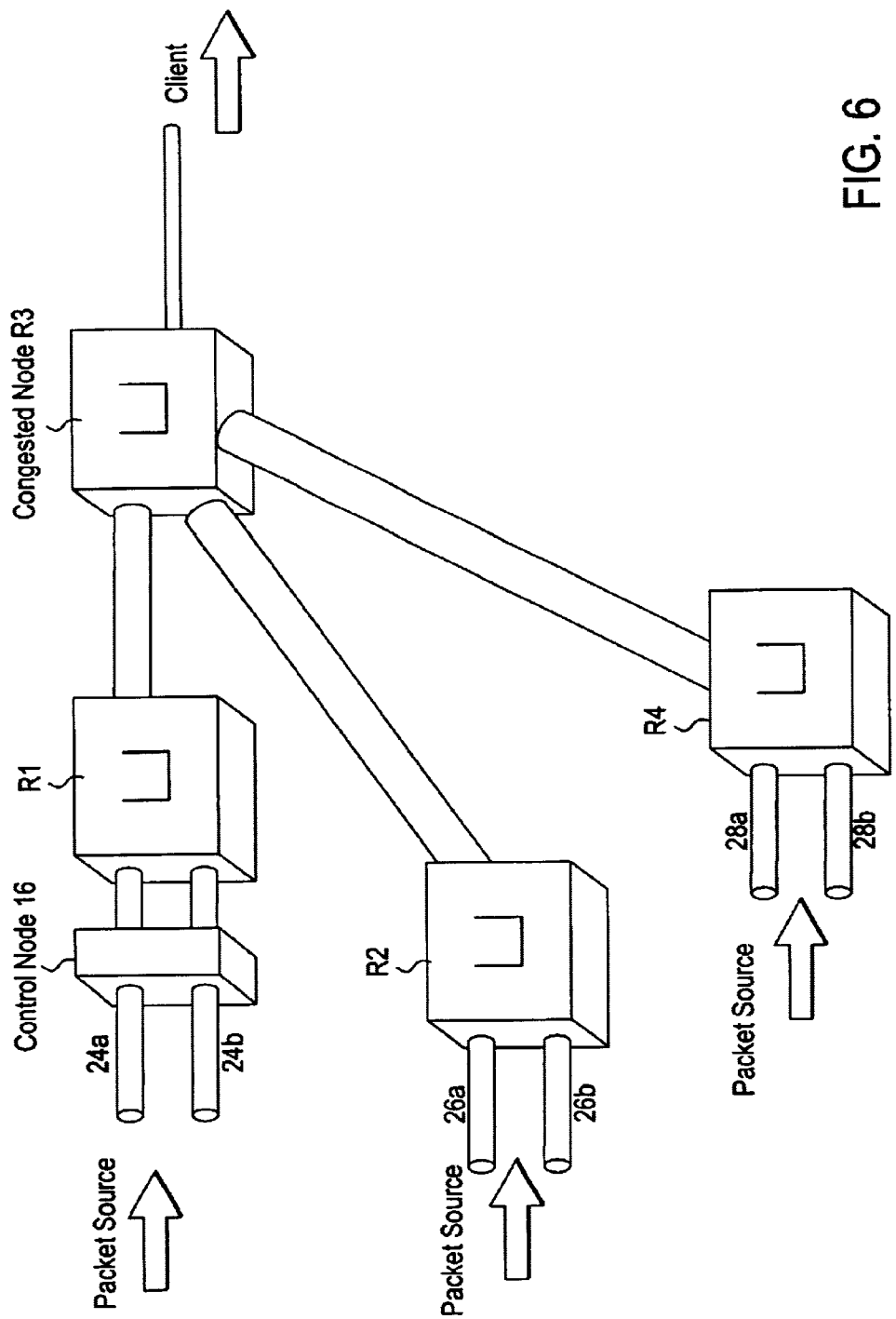
FIG. 6 illustrates a model of a computer network having a feedback control node just prior to node R1 that is upstream of a remote congested node (R3), and in addition two external uncontrolled sources of traffic flowing into the congested node. The first external source flows through node R2 and has twice the number of streams as through the feedback control node. The second external source flows through node R4 and has 20 times the number of streams as our control node.

To further illustrate this benefit, consider the specific network topology shown in FIG. 6. A feedback control node 16 is positioned upstream of node (e.g., router) R1 that is itself upstream of a remote congested node R3. The feedback control node 16 is associated with two communication links 24a and 24b. In addition, two external uncontrolled sources of traffic flow into the congested node R3. The first external source (associated with communication links 26a and 26b) flows through node R2 and has twice the number of streams as flow through the feedback control node 16. So, if the number of streams associated with communication links 24a and 24b is 50 streams/port (or link), then the number of streams/port over communication links 26a and 26b is 100. The second external source provides traffic flows through node R4 and has 20 times the number of streams as our control node. Thus, continuing the above example, this source will provide 1000 streams/link (port).

Figure 7:
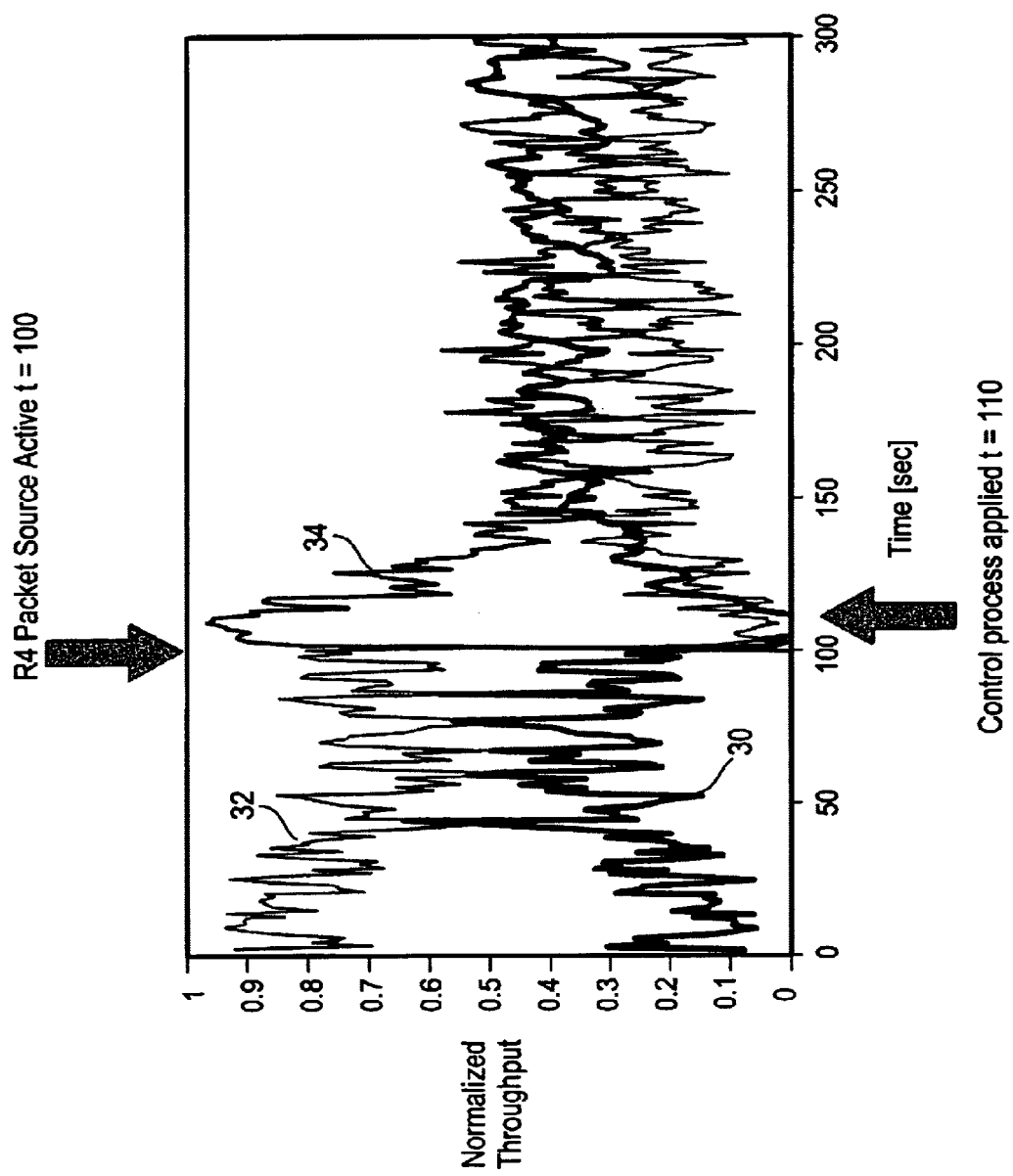
FIG. 7 shows the throughput improvement for the feedback controlled traffic illustrated in FIG. 6 in the face of the two external sources of traffic. The second source of traffic through node R4 is turned on at times greater than 100 seconds.

Now refer to FIG. 7. The controlled traffic through node R1 (represented by curve 30) and the external traffic through node R2 (represented by curve 32) are turned on at time equal to 0 seconds. The external traffic through node R4 (represented by curve 34) is turned on at times greater than 100 seconds to demonstrate a dramatic increase in external load. This may correspond to a so-called "flash load" that might be experienced when a large number of Internet users are seeking recently posted content from one or more Web sites.

The feedback control process is introduced at times greater than 110 seconds. Here, a delay of 10 seconds was provided simply to allow some of the users in the flash load an opportunity to access the sought after content, but in fact no such time delay need be provided at all, or it may be offered for a period longer than 10 seconds. In other words, 10 seconds is merely an example. As shown in the graph, when the external traffic through node R4 is first turned on at 100 seconds, the throughput through node R1 drops significantly due to the additional load. However, when the feedback control processes are activated, despite the tremendous external load due to the traffic through nodes R2 and R4, the controlled traffic is able to flow through the congested node R3 with minimal packet loss and significant increase in bandwidth utilization. The results described in FIGS. 6 and 7 serve to illustrate that the present feedback control processes can deliver end-to-end benefits to the client streams across a given network topology, even when the congestion point is multiple nodes downstream of the control unit with additional external uncontrolled traffic.

Thus a scheme for increasing traffic flow in a computer network has been described. By reducing the end-to-end packet loss using the present feedback control mechanisms, traffic flow across the entire network topology is improved.

The feedback control methodology described herein can be applied on a port-by-port, link-by-link and/or traffic flow-by-traffic flow basis. That is, the control methods can be introduced at the physical or logical level, allowing true end-to-end quality of service (QoS) to be provided. It should be remembered that although the foregoing description and accompanying figures discuss and illustrate specific embodiments, the broader scope of present invention should be measured only in terms of the claims that follow.

What is claimed is:

1. A method of controlling packet loss within a congested network, comprising dynamically modulating packet bandwidths over selected communication links within the network at control points thereof in response to measured network performance metrics; and providing feedback to packet origination locations so as to cause these origination locations to alter the rate at which new packets are introduced into the network, wherein the network performance metrics are measured according to at least one of a moving average of a measured quantity, a standard average of the measured quantity, or another filtered average of the measured quantity.

2. The method of claim 1 wherein the modulation of the packet bandwidth is performed at an aggregate level for all traffic streams utilizing the selected communication links.

3. The method of claim 1 wherein the network performance metrics are selected from the list including: throughput of the selected communication links input to the control points and/or buffer occupancy level at the control points.

4. The method of claim 1 wherein the modulation of the packet bandwidth is achieved by varying an inter-packet delay time over the selected communication links at the control points.

5. The method of claim 1 wherein the control points are located upstream of congested nodes within the network.

6. The method of claim 1 wherein the control points are located downstream of congested nodes within the network.

7. The method of claim 1 wherein the control points are located on only a few of a number of communication links that are coupled to a congested node within the network.

8. The method of claim 1 wherein the control points are associated with only a fraction of a total number of traffic streams applied to a congested node within the network.

9. A method of controlling packet loss within a congested network, comprising:

modulating packet bandwidths over selected communication links according to a process that can be represented by a nonlinear differential equation that involves a product of throughput of the communication links and a buffer occupancy level of a control node associated with the communication links.

10. The method of claim 9 wherein control terms of the nonlinear differential equation involve one or more of a relaxation time, a coupling constant, a control constant and one or more nonlinear feedback constants.

11. The method of claim 10 wherein the relaxation time is set empirically according to network conditions so as to provide a desired response time to fluctuations in traffic within the network.

12. The method of claim 10 wherein the nonlinear differential equation involves a product of the throughput of the communication links and the buffer occupancy level of a control node associated with the communication links.

13. A communication network comprising a number of nodes interconnected with one another through one or more communication links, a first one of the nodes being configured to control packet loss within the network by modulating packet bandwidths over selected ones of the communication links according to a process that can be represented by a nonlinear differential equation that involves a product of throughput of the selected communication links and a buffer occupancy level of the first node.

14. The network of claim 13 wherein control terms of the nonlinear differential equation involve one or more of a relaxation time, a coupling constant, a control constant and one or more nonlinear feedback constants.

15. The network of claim 14 wherein the relaxation time is set empirically according to network conditions so as to provide a desired response time to fluctuations in traffic within the network.

16. The network of claim 14 wherein the nonlinear differential equation involves a product of the throughput of the communication links and the buffer occupancy level of a control node associated with the communication links.

17. A method of controlling packet loss within a congested network, comprising dynamically modulating packet bandwidths over selected communication links within the network at control points thereof in response to measured network performance metrics; and providing feedback to packet origination locations so as to cause these origination locations to alter the rate at which new packets are introduced into the network, wherein the control points are associated with only a fraction of a total number of traffic streams applied to a congested node within the network.

18. The method of claim 17 wherein the modulation of the packet bandwidth is performed at an aggregate level for all traffic streams utilizing the selected communication links.

19. The method of claim 17 wherein the network performance metrics are selected from the list including: throughput of the selected communication links input to the control points and/or buffer occupancy level at the control points.

20. The method of claim 17 wherein the network performance metrics are measured according to at least one of: a moving average of the measured quantity, a standard average of the measured quantity, or another filtered average of the measured quantity.

21. The method of claim 17 wherein the modulation of the packet bandwidth is achieved by varying an inter-packet delay time over the selected communication links at the control points.

22. The method of claim 17 wherein the control points are located upstream of congested nodes within the network.

23. The method of claim 17 wherein the control points are located downstream of congested nodes within the network.

24. The method of claim 17 wherein the control points are located on only a few of a number of communication links that are coupled to a congested node within the network.

* * * * *